C. V. & J. W. BAKER.
Churn.
No. 206,413. Patented July 30, 1878.
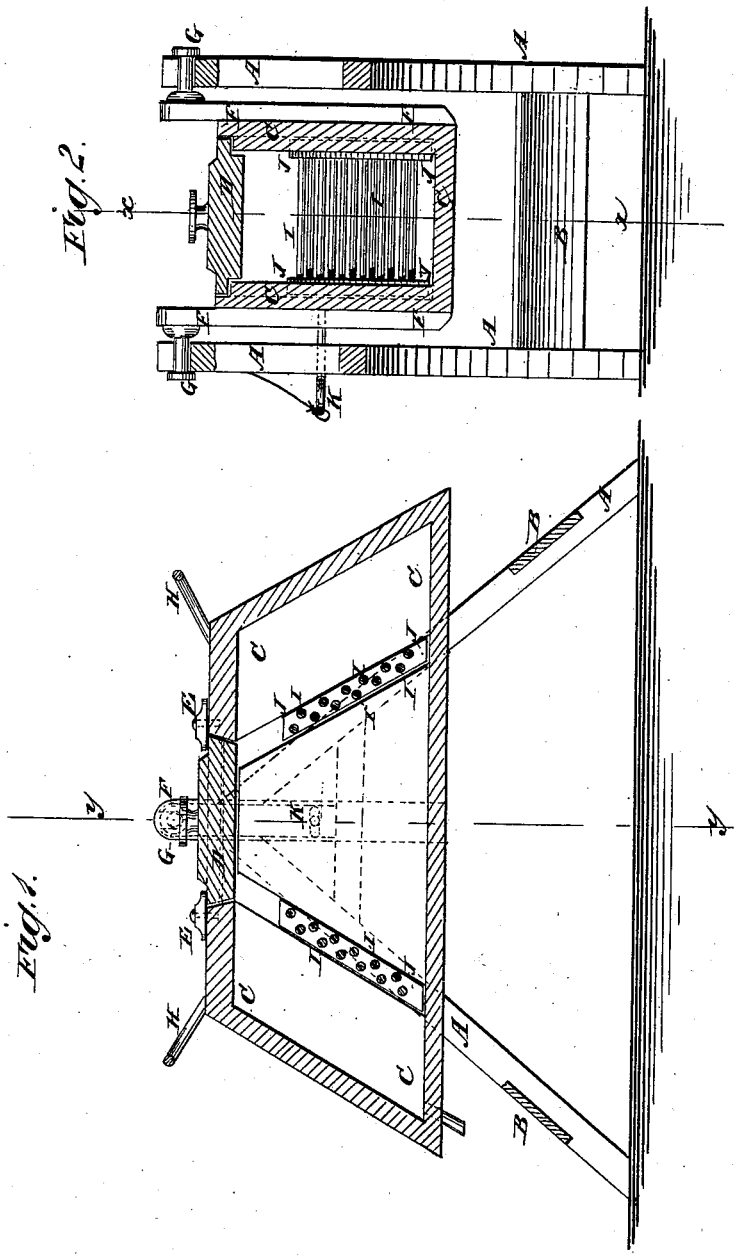
WITNESSES:
Francis McArdle.
C. Sedgwick
INVENTOR:
C. V. Baker
J. W. Baker
BY Munn & Co
ATTORNEYS.

UNITED STATES PATENT OFFICE.

CHARLES V. BAKER AND JACOB W. BAKER, OF MIDDLEBOURNE, OHIO.

IMPROVEMENT IN CHURNS.

Specification forming part of Letters Patent No. 206,413, dated July 30, 1878; application filed May 10, 1878.

*To all whom it may concern:*

Be it known that we, CHARLES V. BAKER and JACOB W. BAKER, of Middlebourne, in the county of Guernsey and State of Ohio, have invented a new and useful Improvement in Churns, of which the following is a specification:

Figure 1 is a vertical longitudinal section of our improved churn, taken through the line $x\,x$, Fig. 2. Fig. 2 is a vertical cross-section of the same, taken through the line $y\,y$, Fig. 1.

Similar letters of reference indicate corresponding parts.

The object of this invention is to furnish an improved churn which shall be simple in construction, inexpensive in manufacture, and convenient and effective in use, bringing the butter in a very short time, and developing all the butter there may be in the milk.

A are two A-frames, which are placed parallel with each other, and are connected near their lower ends by cross-bars B. C is the churn-body, which is made long and narrow, with vertical sides and inclined ends, as shown in Figs. 1 and 2. The middle part of the top of the churn-body C is left open, and is closed with a closely-fitting cover, D, which is secured in place by buttons E, or other convenient fastenings.

To the middle part of the sides of the churn-body C are attached bars F, which project above the top of the churn, and have outwardly-projecting pivots G attached to them, which enter notches or bearings formed in the upper ends or angles of the frame A, so as to suspend the churn-body C from the said frames.

To the upper-end corners of the churn-body C are attached handles H, for convenience in operating the churn. In the inner surface of the sides of the churn-body C are formed grooves, into which are slid beaters, which are formed by attaching cross-bars I to side bars J. The cross-bars I are arranged in two rows, alternating with each other, as shown in Fig. 1. The grooves in the sides of the churn-body C are formed parallel or nearly parallel with the inclined ends of the said churn-body, and in such positions that the beaters I J may be conveniently slipped out through the opening in the top of the said churn-body, to enable them and the churn-body to be easily and conveniently cleaned.

With this construction the churn is operated by taking hold of one of the handles H, and tilting the churn first in one and then in the other direction. This movement of the churn-body C causes the milk to be dashed violently from one end of the said churn-body to the other, and through the spaces between the cross-bars I of the beaters I J, throwing the milk into such agitation as to bring the butter in a very short time, and produce butter superior in quality and more abundant in quantity than the same amount of milk churned in an ordinary churn.

The buttermilk is withdrawn from the churn-body C through a faucet or discharge-opening in its bottom near one end. The churn-body C is held stationary while putting in the milk, taking out the butter, &c., by a pin, K, passed in through a hole in the center bar of the frame A, and into a hole in the upright bar F attached to the said churn-body.

The advantage of my churn over other vibrators is that, being provided with a straight bottom and outwardly-inclined ends, the butter comes in about ten minutes, and is gathered in one of the angular end cavities, ready to be taken out.

What I claim is—

A vibrating churn provided with straight bottom and acute-angled ends on each side of beaters I J, as shown and described, for the purpose specified.

CHARLES VURNEN BAKER.
JACOB WASHINGTON BAKER.

Witnesses:
JAMES GARDINER,
WM. B. HAYS.